Eugene Kibele, Inventor
By Jesse R. Stone, Attorney

Patented Mar. 26, 1929.

1,707,017

UNITED STATES PATENT OFFICE.

EUGENE KIBELE, OF SAN ANTONIO, TEXAS.

PUMP VALVE.

Application filed March 29, 1926. Serial No. 98,095.

My invention relates to pump valves such as are ordinarily employed in horizontal pumps of the double acting type, although, as will be obvious, my invention is not confined to this particular use.

It is an object of the invention to provide a pump valve of the character noted, wherein the packing ring is so formed and secured in position as to produce a most efficient packing action and enable the ring to last for long periods of time before it will be necessary to renew the same. It is desired that the ring be compressed and clamped in position so as to place the packing under stress, thereby producing a superior packing and wearing effect in the operation of the valve.

It is also an object to provide a valve seat constructed to co-operate with the valve to furnish a guide enabling the valve to correctly seat at all times.

Figure 1:
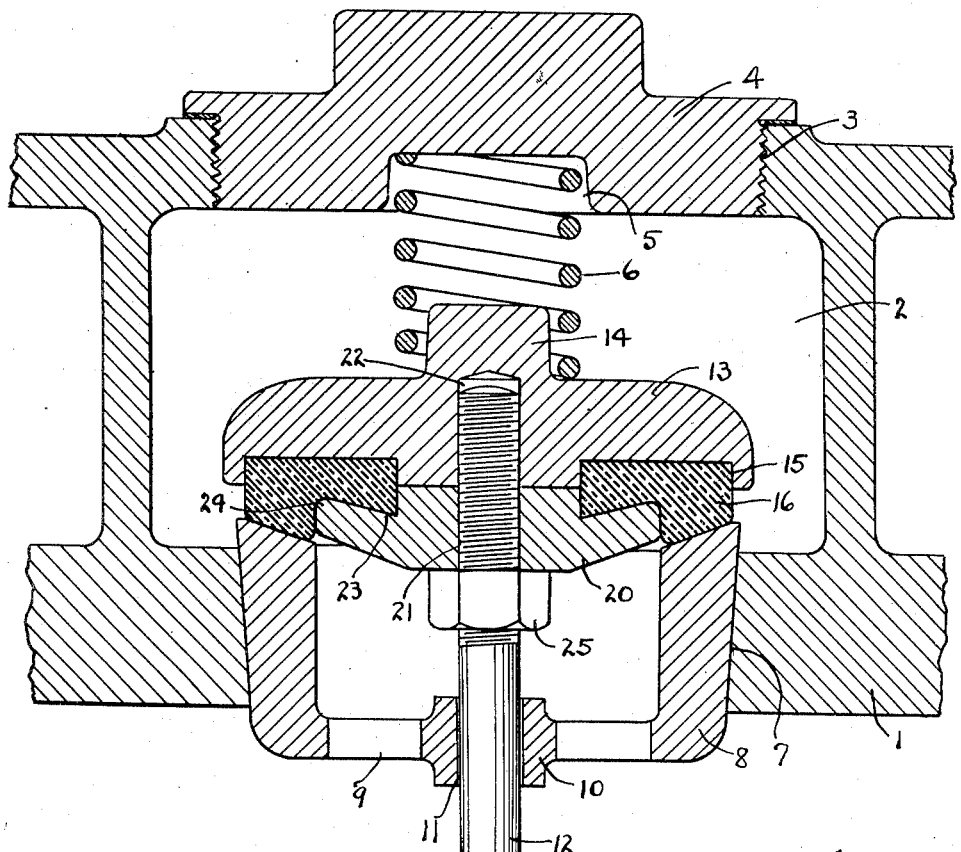
Figure 2:
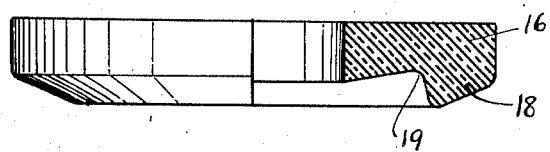

Referring to the drawing herewith, Fig. 1 is a vertical section through the wall of a pump of ordinary construction, showing my valve positioned therein. Fig. 2 is a side view partly in elevation and partly in section showing the shape of the packing washer. Like numerals of reference designate like parts in both the views.

In the drawing, the valve is shown as being secured within the inner wall 1 of a pump casing, the valve adapted to form a passage from the interior of the pump chamber to an outlet passage, indicated at 2. An opening is formed in the chamber 2 above the valve, the said opening being threaded at 3 to receive a plug 4 which is adapted to removably close the opening. The lower side of the plug, therefore, is formed with a recess 5 to receive a spring 6, which will be later described.

The wall 1 of the pump has an opening 7 therein to receive the valve seat 8. I have shown the opening 7 as tapered inwardly so that the valve seat 8 may form a driving fit in the said tapered opening so as to secure the said seat in position. The seat comprises a outer ring which has a spider 9 at its lower end connecting the wall of the ring with a central guide bearing 10. This guide bearing has a central opening 11 therein through which the valve stem 12 may slide. The upper face of the valve seat is tapered downwardly to receive the valve.

The valve member is made up of a valve head 13, which is in the form of a circular plate having an upper cylindrical boss 14 thereon about which the compression spring 6, previously mentioned, is adapted to fit. Said spring bears against the upper face of the plate 13 and tends to hold it downwardly. The lower side of the head member 13 is flat except for an annular recess 15 within which a compressible packing washer 16 is shaped to fit.

The packing washer 16 is formed in the shape of a ring of compressible material, which may be rubber or some similar composition, which is compressible and wear resisting. The upper face of the washer is adapted to fit in the recess 15. The lower side of this washer 16 may have an outer rim 18 which extends downwardly so that it projects slightly beyond the lower face of the ring and is tapered approximately to fit the upper face of the seat 8, although neither ring nor seat need be tapered. The lower face of the ring is thus recessed slightly at 19 by formation of the rim 18, as shown in the drawing, whereby the central portion of the ring is thicker than the web adjacent the rim 18.

The packing washer is held in position and compressed by means of a clamping plate 20, which is provided with a central opening threaded to receive the guide rod 21, the upper end of which is screwed within a recess 22 in the valve head. The said clamping plate 20 fits against the lower face of the head 13 at its central point, but is formed with a recess 23 to receive the central portion of the packing washer, the plate being thereby dished or having its clamping face inclined upwardly and outwardly and rounded off at 24 on its outer edge to fit within the recess 19. A lock nut 25 upon the valve stem 12 is provided for the purpose of locking the clamping plate 20 in operative position.

In clamping the packing washer 16 in position upon the valve head, the outer clamping edge 24 of the plate engages firmly within the recess 19 in the packing washer and compresses the web so as to place particular pressure upon the packing ring at a point approximately midway between the outer and inner sides of the ring. The result of this is to distort the packing washer so as to make an absolute seal between the packing washer and the valve head and the clamping plate. There is, therefore, no possibility of leakage past the valve on the side adjacent the valve head. Furthermore, the clamping of the packing washer at this point has the effect of drawing the lower rim strongly inward. This will be noted by comparing the washer in Figs. 1 and 2. The clamping acts to bring the packing washer into tight contact with the clamping plate and compresses the rubber tightly rounding it off at the point where it engages the seat. I have found by forming the packing washer in this manner and clamping it in position, as described, that the washer may be thus enabled to undergo severe usage for unusually long periods of time without leaking. This is due partly to the particular shape and construction of the clamping washer and the seat and more particularly to the compression of the washer by the clamping plate in the manner described.

Another point of advantage in this construction is that the stem 12 on the valve is directed inwardly and does not interfere with the movement of the valve, and furthermore, that the stem 12 may act not only as a guide but as a securing means through which the clamping plate and the washer are clamped into position. It will be observed that the construction is simple and of few parts, which may be economically constructed.

Having thus described my invention, what I claim as new and desire to protect by Letters Patent is:

1. A valve including a valve seat shaped to fit an opening and comprising a ring, the upper end being inclined downward toward its inner side, and a valve in said seat comprising a head, a packing washer of compressible material on the lower side of said head, said washer having an outer marginal downwardly directed rim, tapered to fit said upper end and a clamping plate having an upwardly inclined portion curved at its outer edge to engage said washer adjacent said rim and compress the same in the manner described and to secure said washer to said valve head.

2. In a pump valve, a seat with a downwardly converging face, a valve head, a compressible packing washer on the lower side of said head, a downwardly-directed rim on said washer, said rim being tapered to fit said seat, and a clamping plate having its clamping face inclined upwardly so as to engage and compress said packing adjacent said rim toward said head, and means to secure said clamping plate to said valve head.

3. In a pump valve, a seat with a downwardly converging face, a valve head, a compressible packing washer on the lower side of said head, a downwardly-directed rim on said washer, said rim being tapered to fit said seat, and a clamping plate having its clamping face inclined to engage and compress said packing adjacent said rim toward said head, and means to secure said clamping plate to said valve head, said means also acting as a guide member.

4. A pump valve comprising in combination a body having a tapered seat thereon, a valve head including a resilient packing ring, means carried by said head and adapted to co-operate therewith to clamp and distort said ring whereby a complete closure of the valve is obtained.

5. A pump valve comprising in combination a tapered seat, a valve head, a resilient ring carried by said head, a downwardly extending rim on said ring adapted to engage said seat and means adapted to clamp said ring to said head and distort said rim.

6. A pump valve including a seat, a valve head, a resilient ring comprising a tapered web and a downwardly extending seat contacting rim, a recess in said head, and a clamping plate to engage said web and compress it in said recess whereby said rim is distorted.

In testimony whereof I hereunto affix my signature this 23d day of March A. D. 1926.

EUGENE KIBELE.